July 17, 1928.

C. A. PARSONS ET AL 1,677,459

STRANDED CABLE

Filed Oct. 3, 1927

INVENTORS:
CHARLES A. PARSONS
JESSEL ROSEN
ARTHUR W. GREY
RONALD W. MIDGLEY

Patented July 17, 1928.

1,677,459

UNITED STATES PATENT OFFICE.

CHARLES ALGERNON PARSONS, JESSEL ROSEN, ARTHUR WALLACE GREY, AND RONALD WALTER MIDGLEY, OF NEWCASTLE-ON-TYNE, ENGLAND; SAID ROSEN, SAID GREY, AND SAID MIDGLEY ASSIGNORS TO SAID PARSONS.

STRANDED CABLE.

Application filed October 3, 1927, Serial No. 223,805, and in Great Britain May 17, 1921.

The invention relates to helically-stranded cables, that is to say, cables which are built up of a number of successive layers of wire of comparatively small section.

While a cable of circular cross-section is often used for example in armature construction, it is frequently necessary to build up a conductor to occupy a slot of the shape such as is sometimes employed in dynamo-electric machinery so that the cable is provided with two square corners, that is to say, a cable of D-section.

Hitherto in order to manufacture a cable of such a shape, it has been customary to construct a round or oval cable in which the number of strands is increased in the well-known manner by six above that in the layer immediately beneath it and then to deform the circular cable to the D-shape required. The crushing of the cable is, however, undesirable as in this operation the insulation of the individual wires is damaged and short circuits generated, which are harmful where the cable is fitted in dynamo-electric machines as they cause serious overheating and also reduce the efficiency of the plant.

A main object of the present invention is to provide an improved method of manufacturing cables of D-section which shall not involve any process of deformation and which will therefore result in cables free from the above-mentioned disadvantages.

According to the present invention, the known principles of cable construction referred to above are modified to the extent that by increasing each layer of strands by seven in relation to the layer immediately beneath it, a D-shaped cable can be produced by laying the individual strands directly in their ultimate positions without a subsequent stage or step of distortion in the process of manufacture.

The invention also consists in the improved cables hereinafter claimed.

In the accompanying drawings:—

Figure 1:
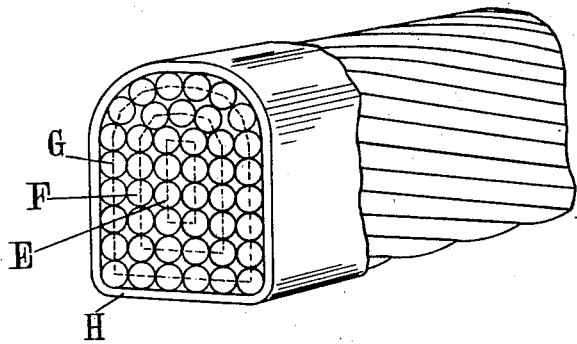
Figure 2:
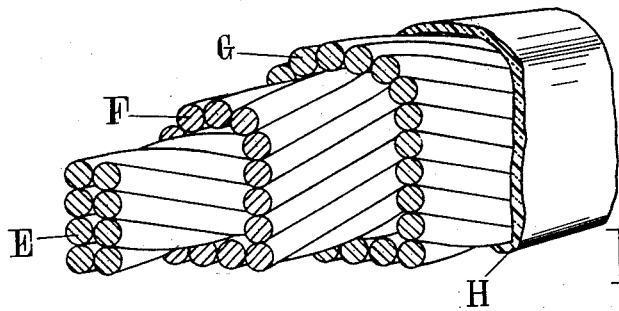
Figure 3:
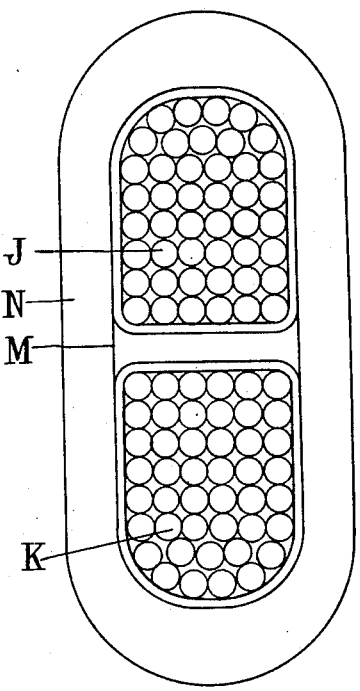

Figure 1 shows a cross-section of one form of D-cable according to the present invention, Figure 2 being a perspective view, while Figure 3 shows in cross-section a conductor formed of two D-shaped cables disposed base to base.

The D-shaped cable shown by way of example in Figure 1 is built up of three layers, E, F, G, the centre lines of which are indicated respectively by dotted lines. The inner layer, E, or core is formed of eight strands arranged in a two-line formation, the intermediate layer, F, of fifteen strands being laid round the core in D-formation to be followed by the outer layer, G, of twenty-two strands, likewise in D-formation. The increment in the number of strands per layer is thus seen to be seven.

The cable is shown in the figures as covered by a lapping of tape H.

The conductor bar of Figure 3 is built up of two D-shaped cables, J and K, as above described arranged with their flat bases together and separated by the insulation strip, M. Such a construction gives a good space factor for the cover while at the same time affording a suitable shape for the moulding in place of the insulation, N.

It will be seen that by the construction described we are enabled to produce a cable the section of which has two square corners, that is to say, the cable is of D-section and it is found that with the increments per layer specified the wires in each D-layer can be easily laid on the 2-line base in situ, (i. e., without subsequent distortion), without any tendency to over-riding and will remain in the correct position without disturbing their neighbours either of the same or adjacent layers.

Having now described our invention, what we claim as new and desire to secure by Letters Patent is:—

1. A method of manufacturing a stranded electric conductor of D cross-section, which consists in helically laying in situ a basic series of strands in a two-line rectangular formation as seen in cross-section at recurrent intervals lengthwise of the conductor and helically laying in situ on said basic series a succession of series of strands in D formation, each series being one-strand thick and having seven more strands than the subjacent series.

2. An electric conductor of D-shaped cross-section built up of a core and superimposed thereon a series of strands helically stranded in a succession of D's, the increment of strands per series being seven.

3. A bar conductor formed of a pair of

D-shaped conductors as claimed in claim 2, with their bases disposed towards one another.

4. An electric conductor of D-shaped cross-section comprising a basic series of helically-laid strands in a two-line rectangular formation as seen in cross-sections taken at certain equidistant points along the length of said conductor and superimposed on said basic series a plurality of series of strands helically laid in a succession of D's, each D of said plurality being one strand thick and having seven more strands than the subjacent series.

In testimony whereof we have signed our names to this specification.

CHARLES ALGERNON PARSONS.
JESSEL ROSEN.
ARTHUR WALLACE GREY.
RONALD WALTER MIDGLEY.